United States Patent

[11] 3,563,554

[72] Inventors Peter Hess
Mammolshain;
Wolfgang Fronek; Heinz Gerjets; Jorg Rodenbeck, Wilhelmshaven, Germany

[21] Appl. No. 833,014
[22] Filed June 13, 1969
[45] Patented Feb. 16, 1971
[73] Assignee Olympia Werke Akteingesellschaft Wilhelmshaven, Germany
[32] Priority June 15, 1968, Apr. 26, 1969
[33] Germany
[31] P1,772,666 and P1,921,350

[54] APPARATUS FOR SETTING A TONE ARM AND HEAD ON SELECTED PORTIONS OF A RECORD CARRIER
19 Claims, 8 Drawing Figs.

[52] U.S. Cl. .......... 274/13, 274/23
[51] Int. Cl. .......... G11b 17/06
[50] Field of Search .......... 274/23, 13, 14

[56] References Cited
UNITED STATES PATENTS

| | | | |
|---|---|---|---|
| 2,489,146 | 11/1949 | Louchheim | 274/2 |
| 2,506,665 | 5/1950 | Giovannucci | 274/2 |
| 2,977,125 | 3/1961 | Mallina | 274/14 |

*Primary Examiner*—Leonard Forman
*Assistant Examiner*—Charles E. Phillips
*Attorney*—Michael S. Striker

ABSTRACT: A tone arm and head thereon can be placed by manual setting means on selected portions of the record carrier. The setting means has a normal inoperative position and a setting position, and first control means place the head in a retracted position when the setting means is moved to the setting position. Second control means prevent the setting means in the inoperative position from moving the tone arm while the head engages the record carrier. The control means prevent together any accidental movement of the head in the active position across the record carrier.

INVENTOR
PETER HESS, WOLFGANG FROHER
HEINZ GERJETS
BY JORG RODENBECK
ATTORNEY

INVENTOR
PETER HESS, WOLFGANG FRONEK
HEINZ GERSETS,
BY JÖRG RODENBECK
[signature]
ATTORNEY

INVENTOR
PETER HESS, WOLFGANG FRONER, HEINZ GERJETS
BY JÖRG RODENBECK

ATTORNEY

APPARATUS FOR SETTING A TONE ARM AND HEAD ON SELECTED PORTIONS OF A RECORD CARRIER

BACKGROUND OF THE INVENTION

It is known to provide a recording and playback apparatus with a device for lifting the tone arm with the head from the record carrier so that the head can be moved to a selected portion of the same. The known apparatus serving this purpose has a disadvantage that it is hardly possible to avoid a lateral force when the tone arm and head are lifted and set down, and such lateral force, which may be very small and not even noticed by the person operating the apparatus, displaces the head out of the groove of the record carrier so that the surface of the same is scratched. However, not only the record carrier, but also the head may be damaged, for example, the pole shoes of the head may be bent or broken off.

Other apparatus is known which permits accurate setting down of the head on the record carrier, but devices of this type do not permit the selection of the exact point of the record carrier where the head is placed, which is a feature highly desirable for dictating apparatus.

SUMMARY OF THE INVENTION

It is one object of the invention to overcome the disadvantages of prior art setting devices for placing a tone arm and a head in a desired position on a record carrier, and provide apparatus for lifting up and setting down a tone arm and a head thereon on a record carrier without any scratching or other damage to the record carrier.

Another object of the invention is to prevent movement of the tone arm as long as the head engages the record carrier.

Another object of the invention is to permit movement of the tone arm and the head only when the head is retracted from the record carrier.

Another object of the invention is to provide a safety device which permits transverse movement of the head over the record carrier only when the head is retracted from the record carrier.

With these objects in view, an apparatus in accordance with the invention serves the purpose of recording on, and playing back of selected portions of a record carrier, and for setting a tone arm and head on selected portions of the record carrier.

One embodiment of the invention comprises a movable tone arm; a head mounted on the tone arm for movement with the same relative to the record carrier in one direction, and for movement relative to the tone arm between an active position cooperating with the record carrier and a retracted position spaced from the same; setting means for the tone arm having an inoperative position, and a setting position for moving the tone arm with the head to selected portions of the record carrier; first control means for placing the head in the retracted position when the setting means is moved to the setting position; and second control means for preventing the setting means in the inoperative position from moving the tone arm while the head engages the record carrier.

Due to the first control means, the head does not engage the record carrier while being moved to a selected portion of the same, while due to the second control means, accidental displacement of the tone arm is prevented while the head engages the record carrier.

In one embodiment of the invention, transverse manual forces acting on the setting means while the head engages the record carrier, cause the automatic operation of blocking means preventing any further motion of the setting means.

Preferably, a setting member is guided by an angular guide means from its normal inoperative position to a displaced position in which it is blocked.

In another embodiment of the invention, the tone arm has guide means which acts on the setting lever when the same is transversely displaced to guide the same to a position in which the head is lifted off the record carrier.

The guide means preferably has two slanted guide faces forming a V-shaped recess so that the setting lever, when urged by manual pressure against one of the guide faces, is deflected by the same to a displaced position for either lifting off the head from the record carrier, or for being blocked.

In another embodiment of the invention, the second control means includes a housing covering the setting means in the inoperative position so that the same cannot be manually operated for moving the tone arm. However, in the setting position, the setting lever partly projects out of the housing and can be manually operated with the tone arm, after the head has been retracted from the record carrier.

In accordance with another embodiment of the invention, the second control means include a manually operated member mounted on the setting means for movement. The manually operated means has an inactivating position in which it is movable relative to the setting means so that a manual force applied thereto cannot move the tone arm and the head, but moves the manually operated means relative to the setting means. The manually operated means is preferably a toothed wheel which can be shifted to a position coupled with the setting means for moving the same with the tone arm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
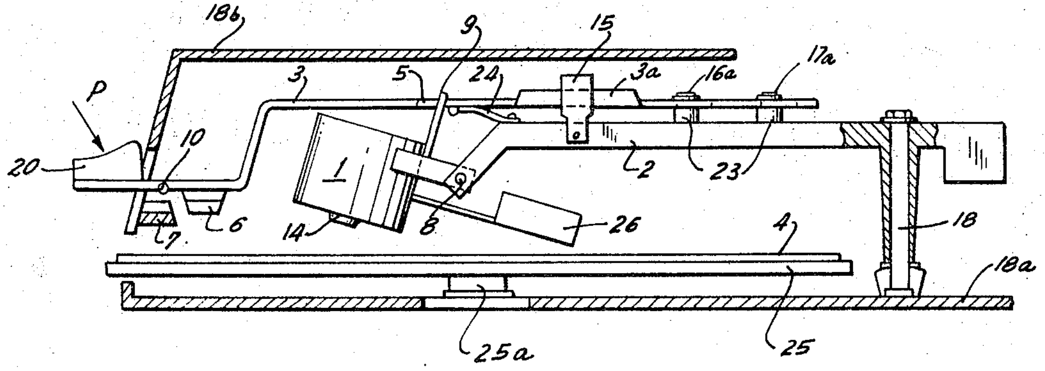
FIG. 1 is a fragmentary vertical sectional view illustrating one embodiment of the invention.
Figure 2:
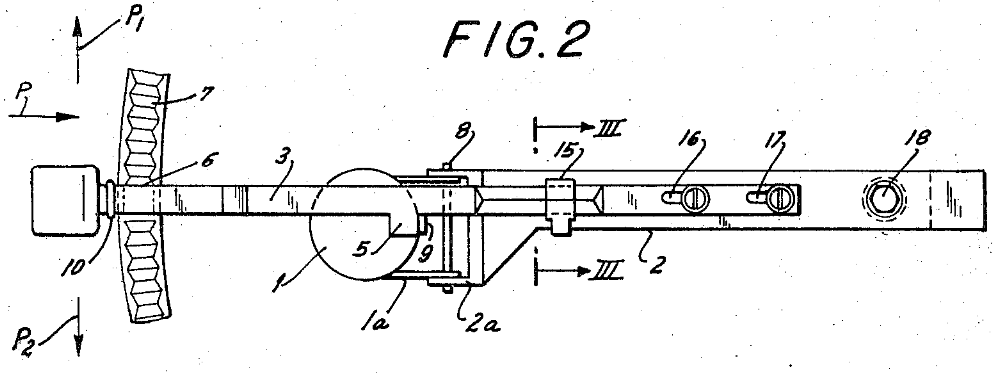
FIG. 2 is a fragmentary plan view of the embodiment of FIG. 1, illustrating another operational position.
Figure 3:
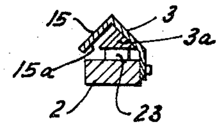
FIG. 3 is a fragmentary cross-sectional view taken on line III–III in FIG. 2 illustrating another operational position.

Referring first to the embodiment of FIGS. 1—3, a tone arm 2 is mounted for angular movement about a pivot 18 which is mounted on a support **18*a*. A head 1 has a pair of brackets 1*a* connected by a pin 8 with a pair of arms 2*a* of tone arm 2 so that the head 1 can be turned between the retracted position shown in FIG. 1, and an active position in which its pole shoe 14 cooperates with a record carrier or record 4 on a turntable 25 which is supported by mounting means 25*a* on support 18*a*. A setting lever 3 is secured by two screws 16*a* and 17*a* to the longer arm of tone arm 2. Screws 16*a* and 17*a* pass through elongated slots 16 and 17 in setting lever 3, and also through spacing means 23. Due to slots 16 and 17, setting lever 3 can be moved in longitudinal direction of tone arm 2 relative to the same. Furthermore, since the slot 16 is wider than slot 17, a limited angular displacement of setting lever 3 about screw 17*a* is possible. When a force P is applied to the manually operated knob 20, setting lever 3 is moved downward, and is also pushed to the right as viewed in FIGS. 1 and 2 from the position of FIG. 2 to the position of FIG. 1 a limited distance determined by the length of slots 16 and 17**.

A prismatic guide portion **3*a* forms part of setting lever 3 and is guided in an angular guide means 15 secured to tone arm 2, as best seen in FIG. 3. In the normal position of the device, the prismatic guide portion 3*a* is located at the center of the angular guide 15, and its upper longitudinal edge engages the apex of the recess 15*a* formed by the angular guide 15**.

A leaf spring 24 is secured to tone arm 2 and has one end cooperating with the ridge on the bottom face of setting lever 3 so that the same is held in a normal position. A control projection 5 of setting lever 3, best seen in FIG. 2, cooperates with an actuating member 9 secured to head 1. In the normal operational position of the apparatus, head 1 can rest on the record carrier 4 and record or play back from the same, but when setting lever 3 is pushed to the right as viewed in the drawing from the position of FIG. 2 to the setting position of FIG. 1 projection 5, acting on actuating member 9, turns head 1 to the retracted position shown in FIG. 1, spaced from record carrier 4.

Near the outer end of setting lever 3, an arresting pawl 6 is provided which cooperates with toothed blocking means in the form of a curved rack bar 7. In the inoperative position of the setting lever 3 shown in FIG. 2, pawl 6 is located above the blocking rack bar 7, but when manual knob 20 is pushed vertically downward, arresting pawl 6 engages the blocking rack bar 7. During such downward movement, the force of spring 24 is overcome, and setting lever 3 bent.

Manual knob 20 is secured to the end of setting lever 3 by a hinge joint 10, which permits clockwise movement of manual knob 20, but no counterclockwise turning downward from the position shown in FIG. 1.

When setting lever 3 is pushed to the setting position shown in FIG. 1, and head 1 is retracted from record carrier 4, arresting pawl 6 is located spaced from blocking rack 7, and setting lever 3 can be turned about pivot means 18 together with tone arm 2 and head 1 to a position in which the head is located directly above a selected point of record carrier 4. When knob 20 is released by the operator, the previously tensioned spring 24 pushes the setting lever 3 to the left as viewed in the drawing to the position of FIG. 2 so that head 1 engages the record carrier 4 at the desired and selected point. Since knob 20 is shaped to produce not only a longitudinal pressure on setting lever 3, but also a downward pressure, arresting pawl 6 may at first engage the blocking rack bar 7 and guided by a recess in the same during movement to the setting position so that at the beginning of the operation, when head 1 is not fully retracted from record carrier 4, no lateral movement of setting lever 3 with head 1 can take place. The longitudinal displacement of setting lever 3 to its setting position is limited not only by slots 16 and 17, but also by the casing 18*b* which is engaged by knob 20.

In the playback position of the apparatus, and also when a new record carrier 4 has been placed on the turntable 25, arresting pawl 6 is located above blocking rack bar 7, but does not engage the same so that a record can be played. When in this position of the apparatus, a lateral force is applied to the manual knob 20 by accident, head 1 would move across the groove in record carrier 4 and scratch the same. This is prevented in accordance with the present invention by the control means shown in FIG. 3 in detail. Accidental lateral pressure on knob 20 causes slight turning of setting lever 3 about screw 17*a*, which is possible due to the greater width of slot 16 than slot 17. The transverse displacement of setting lever 3 causes transverse displacement of the prismatic guide portion 3*a* which engages one of the two guide faces of the angular guide 15 so that the setting lever 3 is forced to move downward while being slightly bent. Downward movement of setting lever 3 places arresting pawl 6 in engagement with the blocking rack bar 7 so that setting lever 3 cannot be displaced with tone arm 2 and head 1. The spacing means 23 facilitate bending of setting lever 3, and since setting lever 3 turns relative to tone arm 2 about screw 17*a*, head 1 remains in the groove of the record carrier 4.

It may still be possible to accidentally lift the setting lever 3 by upward pressure on knob 20, so that arresting pawl 6 is raised above blocking rack bar 7, and then apply a transverse force so that the tone arm and head are improperly displaced. This is prevented by the hinge 10 which permits upward movement of manual knob 20 while arresting pawl 6 remains in engagement with blocking rack bar 7 so that the setting lever 3 cannot be displaced in the direction of movement of tone arm 2 with head 1. This construction also makes impossible to simultaneously lift the setting lever 3 by upward pressure on the manual knob 20, and simultaneously moving the same horizontally with the setting arm 3.

Figure 4:
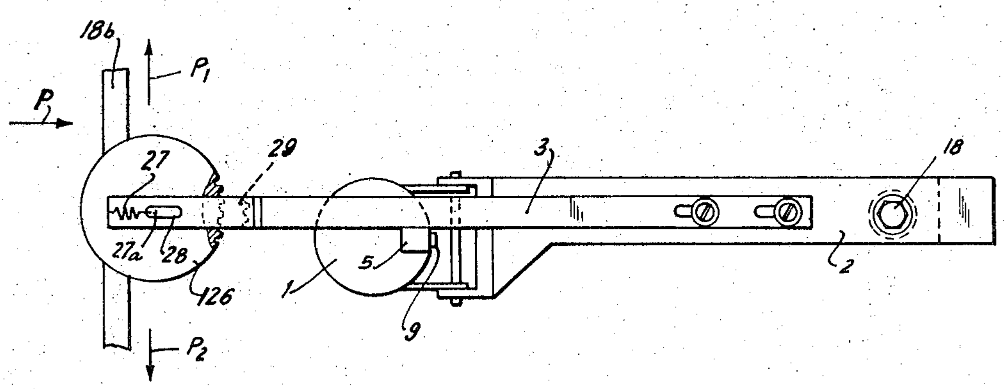
FIG. 4 is a fragmentary plan view illustrating a second embodiment of the invention.

FIG. 4 illustrates a construction corresponding to FIGS. 1—3, but control means preventing movement of setting lever 3 while head 1 engages record carrier 4, are provided in the form of a toothed wheel 126 which has a journal pin 27*a* guided in a slot 28 of setting lever 3. Springs 27 are connected with journal pin 27*a* and urge the toothed wheel 126 to the illustrated position spaced from a corresponding toothed part 29 secured to setting lever 3. A segment-shaped portion of toothed wheel 126 projects through a slot out of housing 18*b*. It is possible to push setting lever 3 longitudinally from the illustrated inoperative position to a setting position in which head 1 is retracted from record carrier 4, as described with reference to FIG. 1. In this position, the peripheral teeth of wheel 126 are in coupling engagement with the toothed coupling part 29. In the normal position of the apparatus shown in FIG. 4, accidental transverse force applied in the direction of the arrows $P_1$ and $P_2$ will cause idle turning of wheel 126 without any influence on setting lever 3 and the tone arm 4 so that the same cannot be accidentally displaced while the head 1 is in engagement with the record carrier 4.

Figure 5:
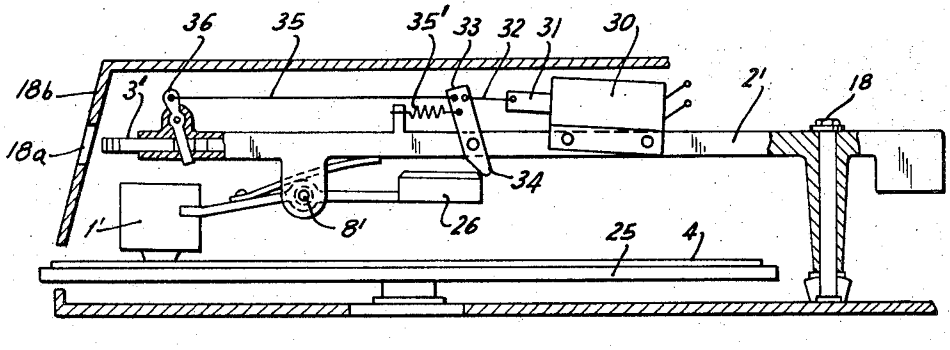
FIG. 5 is a fragmentary vertical sectional view illustrating a third embodiment of the invention.

In the embodiment of FIG. 5, a setting lever 3′ is guided in an interior passage of tone arm 2′. The head 1′ is mounted on a pivot 8′ carried by brackets of the tone arm 2′, and can be retracted from record carrier 4 by pressure on the counterweight 26.

An electromagnetic means 30 is mounted on tone arm 2′ and electrically connected with a switch on the microphone, not shown, by which the apparatus is controlled. The armature 31 of electromagnetic means 30 is connected by wire 32 with a control cam 33 whose cam portion 34 acts on the balancing weight 26. When the microphone switch, not shown, is operated, head 1′ is retracted from the record carrier 4. A spring 37 secured to member 33 and to a projection of tone arm 2′ moves member 33 back to its initial position when the force of electromagnetic means 30 terminates so that the head 1′ returns to its active position engaging the turntable 4.

Member 33 is connected by another wire 35 with a lever 36 mounted for angular movement on tone arm 2′ and having a portion passing through an opening in the setting member 3′ which is located in the interior of tone arm 2′ slidable in the same.

In the normal inoperative position of the setting member 3′ shown in FIG. 5, its end portion is located within the casing 18*a*, and manual operation of setting member 3′ is not possible and prevented. However, when electromagnetic means 30 effects the retractions of head 1′, wire 35 simultaneously turns member 36 so that setting member 3′ is moved to a position in which its end projects out of the opening or slot 18*c* in housing or casing 18*b* so that manual operation is possible for setting tone arm 2′ with head 1′ to a desired point of record carrier 4 while head 1′ is in the retracted position.

Figure 6:
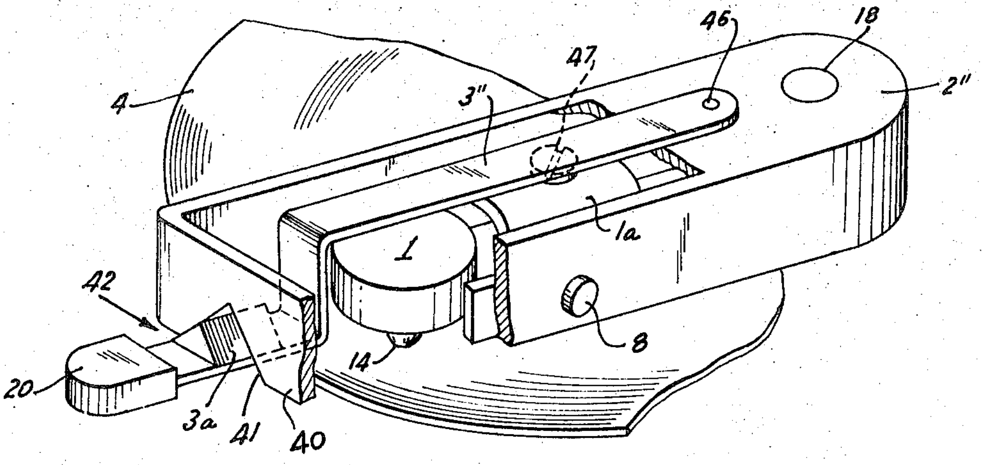
FIG. 6 is a fragmentary perspective view illustrating a fourth embodiment of the invention.

Control means 35, 36 prevent setting member 3′ in the inoperative position shown in FIG. 5 from moving the tone arm while the head 1′ engages the record carrier 4. Control means 33, 26 place the head in the retracted position when the setting member 3′ is moved to the setting position projecting out of the opening 18*c*. Another embodiment is illustrated in FIG. 6. The tone arm 2″ is turnable about pivot 18 and supports a double-armed lever 1*a* carrying on one side the head 1, and on the other side an adjustable screw 47. Setting member 3″ is mounted on tone arm 2″ by means of a joint 46. Tone arm 2″ has a guide portion 40 with an angular recess bounded by two slanted guide faces 41 which cooperate with a prismatic guide portion 3*a* on setting member 3″. The manual knob 20 projects out of a slot of the housing, not shown. When the knob 20 is manually pushed in the direction of the arrow 42, one side of prismatic guide portion 3*a* engages the respective slanted guide face 41 so that setting member 3″ is forced downward to a position engaging screw 47 and turning head 1 about pivot pin 8 so that the head 1 is retracted from record carrier 4, and tone arm 2'' turns with setting member 3'' about pivot 18 until the head 1 is located directly above a selected point of the turntable where setting member 3'' can be released by the operator to resiliently return to its normal position located at the apex of the guide recess formed by guide faces 41, and spaced from screw 47 so that head 1 is moved by gravity to its active position engaging record carrier 4.

During normal claim: of head 1, the knob 20 is simply pressed downward with setting member 3'' so that screw 47 is engaged by setting member 3'' and retracts head 1 whereupon tone arm 2'' is turned by the setting member 3''.

In the embodiment of FIG. 6, the downwardly depressed position of setting member 3'' is the setting position in which control means 47, 1*a* place the head 1 in the retracted position. The second control means in the form of guide means 41, 3*a* prevent the setting member 3'' from moving tone arm 2'' while head 1 engages the record carrier 4.

Figure 7:
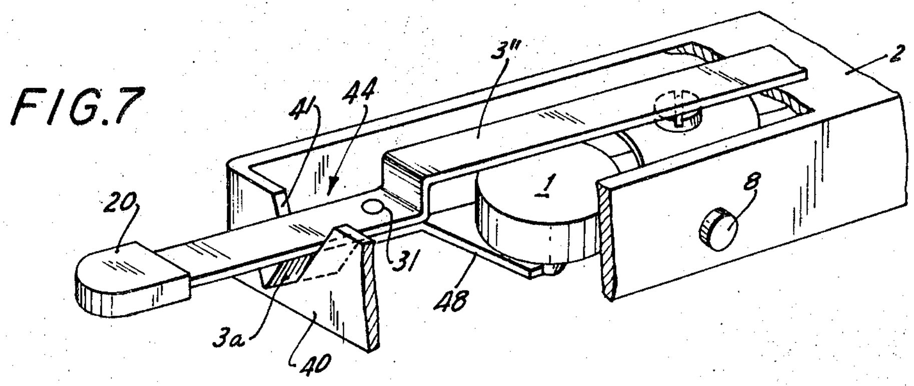
FIG. 7 is a fragmentary perspective view illustrating a modified construction of the embodiment of FIG. 6.

FIG. 7 illustrates a modification of the embodiment of FIG. 6 in which the recess 44 is V-shaped instead of having the form of an inverted V as described with reference to FIG. 6. Setting member 3'' has a normal position located at the apex of the recess 44 and releasing screw 47 so that the head 1 engages the turntable. When setting member 3'' is lifted by upward pressure on knob 20, it retracts head 1 by means of a projecting arm 48. If an attempt is made to apply a horizontal force to setting member 3'' while the same is in the inoperative position illustrated in FIG. 7, guide surfaces 41 urge setting member 3'' by action on the prismatic guide portion 3*a* to move upward out of the recess 44 so that head 1 is lifted off the record carrier.

Figure 8:
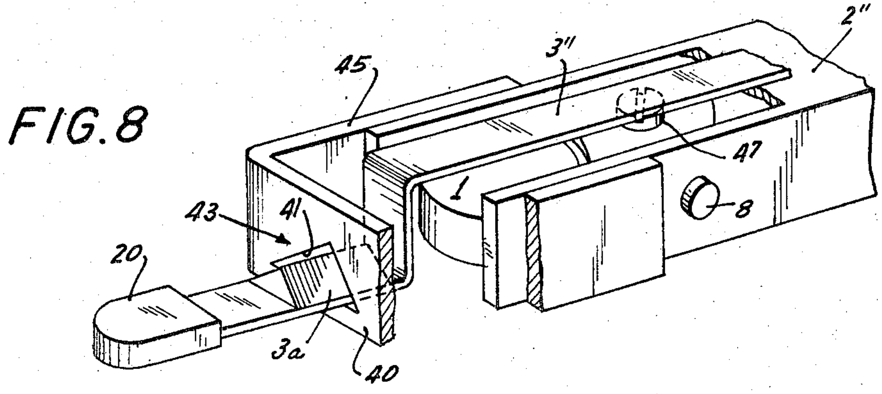
FIG. 8 is a fragmentary perspective view illustrating the further modification of the embodiment of FIG. 6.

In the modification of FIG. 8, an angular part 45 is secured to the tone arm 2'' and provided with a triangular cutout 43 similar to the recess shown in FIG. 6, but closed. When a transverse force is exerted on setting member 3'', it is urged downward by the guide action of the slanted guide faces 41 on prismatic portion 3*a*, so that pressure on screw 47 effects lifting of head 1 from record carrier 4.

It will be understood that each of the elements described above, or two or more together, may also find a useful application in other types of apparatus for setting a tone arm and a head on selected portions of a record carrier differing from the types described above.

While the invention has been illustrated and described as embodied in an apparatus for setting a tone arm and head on a record carrier including control means preventing engagement of the record carrier by the head during manual movement of setting means, and also preventing movement of the setting means while the head engages the record carrier, it is not intended to be limited to the details shown, since various modifications and structural changes may be made without departing in any way from the spirit of the present invention.

We claim:

1. Apparatus for setting a tone arm and head on selected portions of a record carrier, comprising, in combination, a movable tone arm; a strips mounted on said tone arm for movement with the same relative to said record carrier in one direction, and for movement relative to said tone arm between an active position cooperating with said record carrier and a retracted position spaced from the same setting means for said tone arm having an inoperative position, wherein said head is in said active position, and setting means having a setting position for moving said tone arm with said head to selected portions of said record carrier while said head is in said retracted position; first control means for placing said head in said retracted position when said setting means is moved to said setting position so that said head does not engage said record carrier while being moved to a selected portion of the same; and second control means for preventing said setting means in said inoperative position from moving said tone arm while said head engages said record carrier in said active position.

2. Apparatus as claimed in claim 1 wherein said second control means include blocking means for blocking movement of said setting means in said inoperative position with said tone arm in said one direction.

3. Apparatus as claimed in claim 1 wherein said second control means include guide means for guiding said setting means from said inoperative position to a displaced position when a force is applied to said setting means in said inoperative position for moving said tone arm in said one direction, and blocking means for blocking said setting means in said displaced position so that said tone arm cannot be moved by the same in said one direction.

4. Apparatus as claimed in claim 1 wherein said second control means include guide means for guiding said setting means from said inoperative position to said setting position when a force is applied to said setting means in said inoperative position for moving said tone arm in said one direction.

5. Apparatus as claimed in claim 1 wherein said second control means includes a housing covering said setting means in said inoperative position so that the same cannot be manually operated for moving said tone arm in said one direction, and having an opening out of which said setting means partly projects in said setting position for manual operation.

6. Apparatus as claimed in claim 1 wherein said second control means include a manually operated means mounted on said setting means for movement between an inactivating position, and an actuated position coupled with said setting means for moving the same from said inoperative position to said setting position, and in said setting position with said tone arm and head, and being in said inactivating position movable relative to said setting means so that a manual force applied to said manually operated means in said one direction does not move said tone arm with said head, but moves said manually operated means relative to said setting means.

7. Apparatus as claimed in claim 1 wherein said setting means includes a setting lever mounted on said tone arm for limited angular movement, and for longitudinal movement between said inoperative position and said setting position; and wherein said second control means include guide means for guiding said setting lever to a displaced position when a force is applied to said setting lever in said inoperative position for moving said tone arm in said one direction, and blocking means for blocking said setting lever in said displaced position so that said tone arm cannot be moved by the same in said direction.

8. Apparatus as claimed in claim 7 wherein said setting lever has a prismatic guide portion; and wherein said guide means has two slanted guide faces forming a V-shaped recess in which said prismatic guide portion is located so that a limited angular displacement of said setting lever causes engagement of one of said guide faces by said guide portion and displacement of said setting lever to said displaced position; and wherein said blocking means include a segment-shaped blocking rack bar, and an arresting pawl on said setting lever engaging said blocking rack bar in said displaced position of said setting lever, and being spaced from the same in said inoperative and setting positions of said setting lever; and wherein said setting means comprise a spring mounted on said tone arm and biasing said setting lever to move to said inoperative position.

9. Apparatus as claimed in claim 8 wherein said setting means includes a manual knob mounted on said setting lever for angular movement in a direction transverse to said one direction so that a manual force acting on said manual knob for moving the same from said displaced and blocked position to said inoperative position effects displacement of said manual knob relative to said setting lever.

10. Apparatus as claimed in claim 1 wherein said setting lever is mounted on said tone arm for limited angular movement, and also in longitudinal direction for movement between said inoperative and setting positions; and wherein said second control means include a manually operated toothed wheel mounted on said setting lever for turning movement in said one direction, and for longitudinal movement to a coupling position, a coupling part secured to said setting lever and being engaged by said toothed wheel when the same is manually moved to said coupling position whereupon further longitudinal movement of said manually operated wheel causes movement of said setting lever to said setting position whereby manual pressure on said wheel causes movement of said tone arm with said head in said one direction, and a spring urging said wheel to a normal position spaced from said coupling part so that a manual force exerted on said manually operated wheel in said one direction causes turning movement of said wheel without displacement of said setting lever.

11. Apparatus as claimed in claim 1 wherein said setting means includes a setting lever mounted on said tone arm for longitudinal movement between said inoperative and operative positions; wherein said tone arm includes means for mounting said head for angular movement between said retracted and active positions; and wherein said first control means comprising projecting portions on said setting lever and said head engaging each other during movement of said setting lever to said setting position whereby said head is angularly displaced from said active position to said retracted position, and is held in said retracted position until said setting lever is moved back to said inoperative position.

12. Apparatus as claimed in claim 1 wherein said second control means include a housing having a slot; and wherein said setting means in said inoperative position is located within said housing, and projects in said setting position out of said slot for manual operation; and comprising operating means for moving said setting means between said inoperative and setting positions, and said head between said active and retracted positions.

13. Apparatus as claimed in claim 12 including lever means for mounting said head on said tone arms; and wherein said operating means include an electromagnetic means, a cam member operated by said electromagnetic means and cooperating with said lever for moving said head between said active and retracted positions, and another control member operated by said electromagnetic means and connected with said setting means for moving the same between said inoperative and setting positions.

14. Apparatus as claimed in claim 1 wherein said setting means includes a setting lever, and means mounting said setting lever on said tone arm for angular movement between said inoperative and setting positions; wherein said first control means include lever means mounting said head on said tone arm for angular movement between said active and retracted positions, said lever means having a portion engaged by said setting lever in said setting position for causing pivotal movement of said lever means with said head which moves to said retracted position; and wherein said second control means include a guide part secured to said tone arm and having a V-shaped recess bounded by slanted guide faces, said setting lever having a guide portion located in said recess so that movement of said setting lever in said inoperative position in said one direction, causes engagement between said guide portion and one of said slanted guide faces whereby said setting lever is moved by manual pressure to said setting position and effects movement of said head to said retracted position.

15. Apparatus as claimed in claim 14 wherein said tone arm moves in a horizontal plane; wherein said setting lever moves in a vertical plane; wherein said guide portion is prismatic and has a triangular cross section; and wherein said V-shaped recess widens and opens downward in said guide part.

16. Apparatus as claimed in claim 14 wherein said tone arm moves in said one direction in a horizontal plane; wherein said setting lever moves in a vertical plane between said inoperative and operative positions; wherein said guide portion is a prismatic guide portion having a triangular cross section; and wherein said v-shaped recess widens and opens upward in said guide part; and wherein said first control means include a member mounted on said setting lever and engaging said head for moving the same to said retracted position when said setting lever is moved to said setting position.

17. An apparatus as claimed in claim 14 wherein said recess is closed and forms a triangular cutout in said guide part; and wherein said guide portion is a prismatic guide portion having triangular cross section and being located in said cutout.

18. An apparatus as claimed in claim 14 wherein said tone arm is substantially U-shaped and has two leg portions between which said head and lever means are located, wherein said guide part connects the ends of said legs, and wherein said setting lever is mounted on said tone arm parallel to said legs and passing though said V-shaped recess.

19. An apparatus as claimed in claim 18 wherein said V-shaped recess, said head, the pivot axis of said setting lever and the pivot axis of said tone arm are located in a common plane.